No. 645,678. Patented Mar. 20, 1900.
C. W. BOGART.
FRICTION CLUTCH.
(Application filed Aug. 21, 1899.)

(No Model.) 3 Sheets—Sheet 1.

Attest.
Chilion W. Farrar
George Jarrett

Inventor.
Charles William Bogart.

No. 645,678. Patented Mar. 20, 1900.
C. W. BOGART.
FRICTION CLUTCH.
(Application filed Aug. 21, 1899.)

(No Model.) 3 Sheets—Sheet 2.

Attest.
Chilion McFarian
George Jarrett

Inventor.
Charles William Bogart

No. 645,678. Patented Mar. 20, 1900.
C. W. BOGART.
FRICTION CLUTCH.
(Application filed Aug. 21, 1899.)

(No Model.) 3 Sheets—Sheet 3.

Attest. Inventor.
Charles William Bogart.

UNITED STATES PATENT OFFICE.

CHARLES W. BOGART, OF BUFFALO, NEW YORK.

FRICTION-CLUTCH.

SPECIFICATION forming part of Letters Patent No. 645,678, dated March 20, 1900.

Application filed August 21, 1899. Serial No. 727,871. (No model.)

*To all whom it may concern:*

Be it known that I, CHARLES W. BOGART, a citizen of the United States, and a resident of Buffalo, New York, have invented certain new and useful Improvements in Friction-Clutches, of which the following is a specification.

My invention relates to friction-clutches of that class wherein an expansible metallic ring is used to engage with the inner side of the rim of a pulley to cause the pulley to rotate with the driving-shaft or being disengaged therefrom to permit the pulley to remain at rest during the rotation of the shaft; and the objects of my improvement are to provide a clutch of very great efficiency in transmitting power, to provide means for the necessary adjustment of parts to compensate for wear, to provide a construction adaptable to pulleys or gear-wheels of small diameter as compared with the diameter of the driving-shaft, and to provide mechanism that will occupy as little length as possible of the driving-shaft beyond the end of the pulley.
My improved clutch has been designed with reference to use on gas-engines, where it is desirable to keep the projecting portion of the shaft beyond the pulley as short as possible, and especially for use on gas-engines used in the "oil country" for pumping purposes, where the rotative speed of the driving-shaft is comparatively low, the diameter of the pulleys small, the shafts large, and the belt strains severe.
Where the available space between the rim and hub of pulleys is very limited, it is almost impossible to crowd therein sufficiently-powerful mechanical movements as ordinarily designed for clutches.
The objects of my improvement are attained in the following-described manner, as illustrated by the accompanying drawings, in which—

Figure 1:
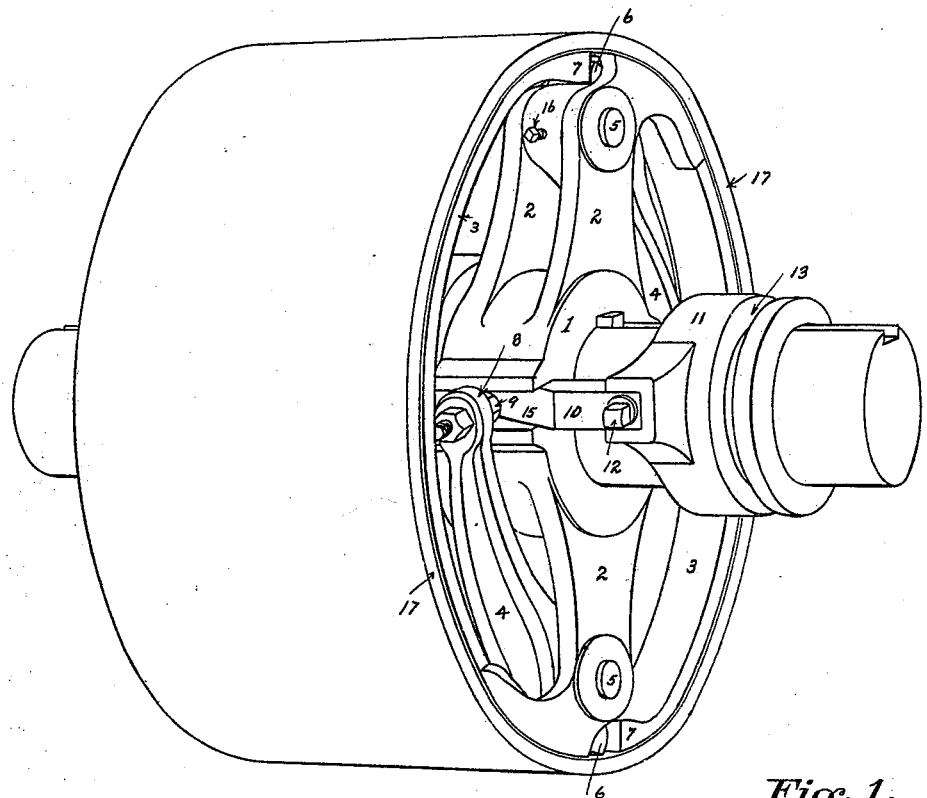
Figure 2:
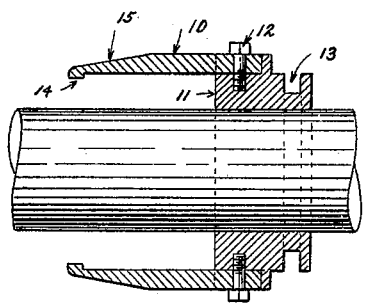
Figure 3:
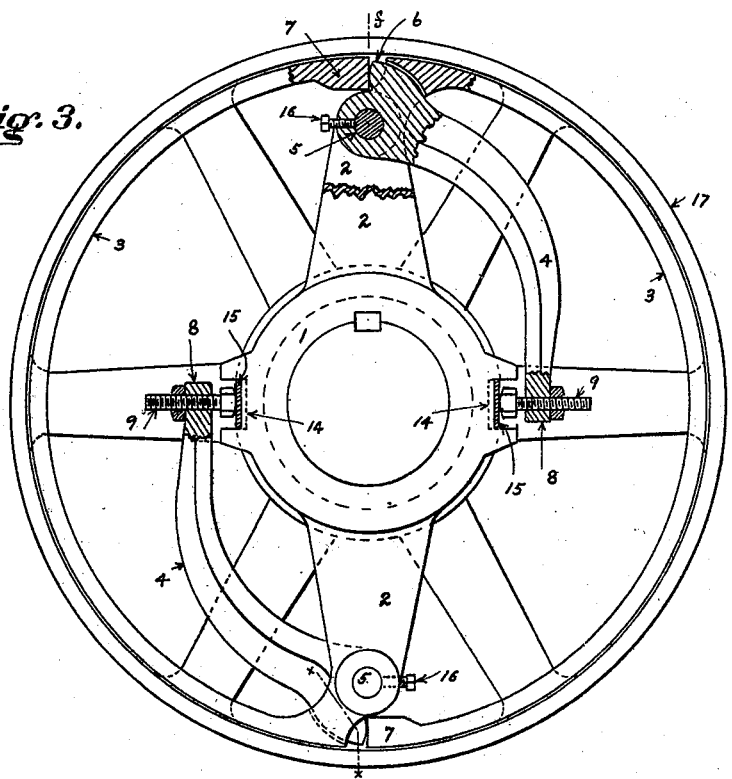
Figure 4:
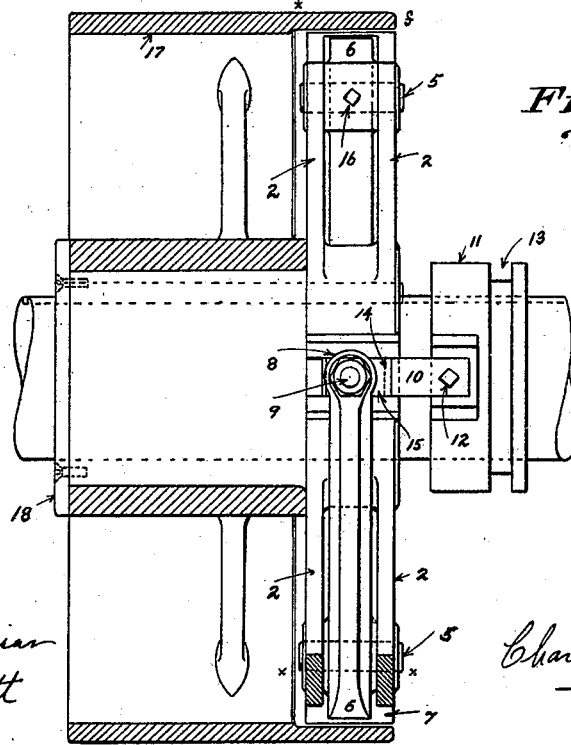
Figure 5:
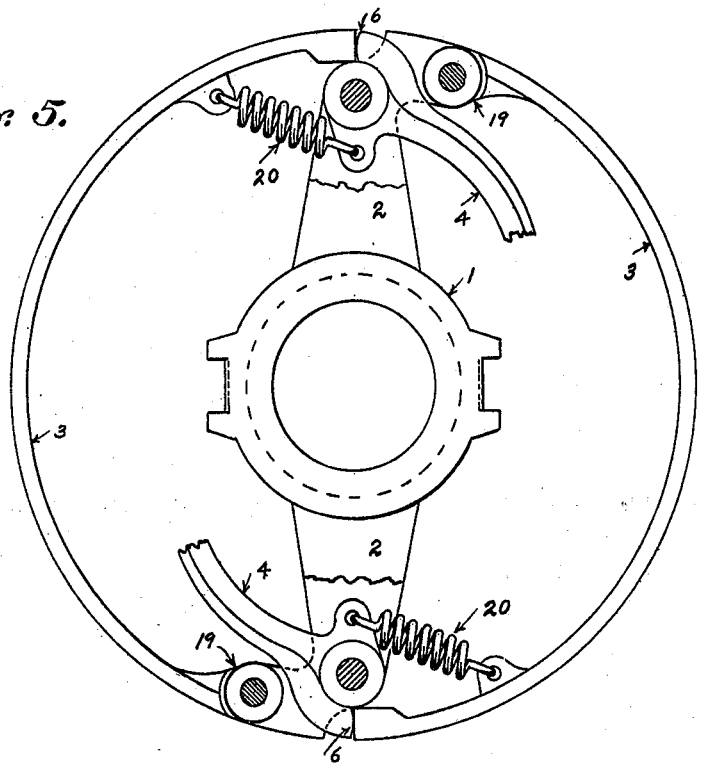

Figure 1 shows the complete clutch in perspective;
Fig. 2, a longitudinal section of the thrust-collar; Fig. 3, an end elevation of the clutch; Fig. 4, a side elevation thereof with parts in section; Fig. 5, an end elevation with parts broken away, showing a modified form of construction; and Fig. 6, an end elevation showing the clutch applied to a gear-wheel.

In the drawings, 1 represents the hub of the clutch, keyed or otherwise secured on the driving-shaft and formed with radial arms 2, that project in pairs from its opposite sides. One-half of bisected friction-ring 3 is formed integral with each pair of said arms. Curved levers 4 are secured, by means of screws 16, to pins 5 and are fulcrumed by said pins between the ends of corresponding pairs of said radial arms. The rear end of each of said curved levers terminates beyond the fulcrum in a curve-faced projection or cam 6, adapted to movably abut against the enlarged end 7 of that portion of the friction-ring 3 that is contiguous thereto. Adjusting-screws 9, provided with lock-nuts, are secured in the ends 8 of the respective curved levers 4 and are adjustable in radial lines (more or less) toward hub 1. Thrust-collar 11 is splined on the shaft and contains an annular groove 13 for the attachment therein of suitable shifting mechanism. Wedges 10, preferably of steel, are rigidly secured at one end by screws 12 to opposite sides of said collar and project rearwardly therefrom parallel with the shaft. Each of said wedges is formed straight or with parallel faces for some distance from the collar and is thence tapered toward the point by an inward slant or inclination of its outer face 15. Hooks 14 terminate the points of the wedges toward each other and are adapted to engage with corresponding notches in hub 1 to limit the outward movement of the thrust-collar. The inside of pulley-rim 17 is finished to a true circle to the extent necessary for the engagement therewith of friction-ring 3 when it is forcibly expanded by the wedges 10.

In Fig. 5 is shown a modified form of construction, wherein the halves of friction-ring 3 are detachably hinged at 19 to the extremity of corresponding pairs of radial arms 2 in order that a new ring may be substituted for one that becomes worn or broken.

Where the diameter of the pulley and of the friction-ring is large, it becomes necessary to counteract the centrifugal action of the free ends of the friction-ring and of the curved levers. Springs 20 serve this purpose by being attached to the levers and ring by their respective ends, as shown, and arranged to pull said ring and levers toward the shaft.

These springs may also be used to advantage in the form of clutch shown in Fig. 3, wherein the friction-ring is formed integral with the radial arms, and they are desirable where the speed of the shaft is high.

Figure 6:
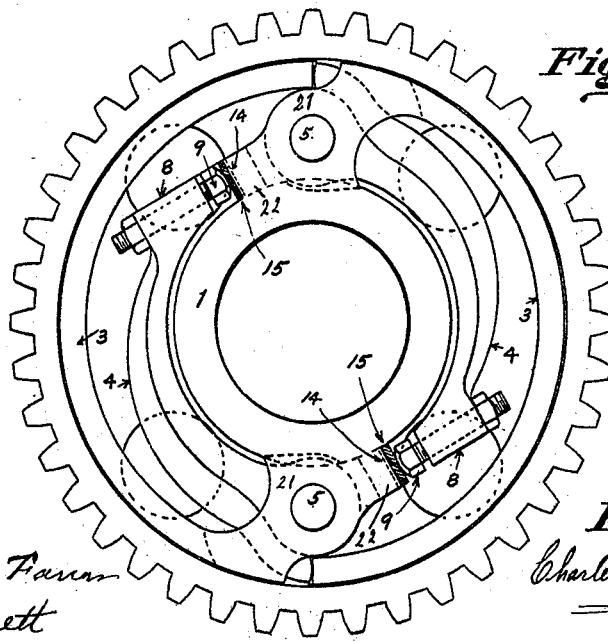

To substitute a gear-wheel for the pulley or where the radial width of the space between the hub and the rim is very limited, as shown in Fig. 6, the radial arms may be dispensed with and curved levers 4 fulcrumed in bosses 21, formed on opposite sides of the hub 1. Lugs 22 are formed on the heel of levers 4 in a line tangent with the hub, and the adjusting-screws 9 in the front end of the opposite lever are made adjustable toward and from the contiguous lug and in the same tangent line therewith. Wedges 10 are secured to the thrust-collar in a position to move the adjusting-screws 9 outward from lugs 22 and in a line tangent to the hub instead of in a direction radial thereto, as shown in Fig. 3.

The internal diameter of the gear shown in Fig. 6 is much smaller and that of the shaft much larger than those of the pulley and shaft shown in Fig. 3, and the radial width of the space between the hub and gear is very limited. The length, however, of the levers 4 from fulcrums 5 to the contact-point of adjusting-screws 9 with the wedges is substantially the same in both Figs. 3 and 6. Hence the same gripping power of the friction-ring may be secured in either form of construction. The same proportions as shown in Fig. 6, where the pitch diameter of the gear is only three times the diameter of the shaft, have been used in practice with my improved construction to transmit an amount of power from the shaft to the gear equal to the full strength of the teeth of the gear.

In Fig. 4 the pulley is shown sleeved on an extension of hub 1 and retained thereon by means of collar 18. Where the size of the clutch will permit the extension of the hub and the collar to be dispensed with, the pulley may have its bearing directly on the shaft.

In operation, when the thrust-collar 11 is shifted toward the pulley, the tapered portion of the wedges engage with the adjusting-screws 9 and force the front ends of levers 4 in an outward direction. This movement of the levers 4 actuates cams 6 with a powerful thrusting force against the free ends 7 of the corresponding halves of the friction-ring 3 until it is expanded into immovable engagement with the inner side of the rim of the pulley 17. The force exerted by the expansion of the ring depends upon the steepness of the inclined portion of the wedges and the length of levers 4 between the adjusting-screws 9 and fulcrums 5 in relation to the distance beyond the fulcrums of the contact-point of cams 6 with the ends 7 of the friction-ring 3. If the wedges are shifted with their level heel portions under the adjusting-screws, the pressure of the screws thereon will keep the wedges from slipping and maintain the clutch in gripping engagement with the pulley without the aid of the thrust-collar or the shifting mechanism.

By providing the hub 1 with diametrically oppositely arranged arms 2 and providing each arm with a sector or bisected friction-ring and a lever and also providing the thrust-collar with diametrically oppositely arranged wedges the entire device balances itself on the shaft and the pulley is not thrown out of true when running and especially when running at a high rate of speed.

Having fully described my improvement, what I claim as new, and desire to secure by Letters Patent, is—

1. In a friction-clutch, the combination, with a pulley, of a hub therein provided with diametrically oppositely arranged arms, each provided with a friction-ring, a lever pivotally secured to each arm, a spring connected with the lever and the free end of the opposite ring, and oppositely-located wedges for engaging with the levers and throwing the rings into engagement with the pulley.

2. In a friction-clutch, the combination, with a pulley, of a hub provided with diametrically oppositely located arms and shoulders, a friction-ring for each arm, a lever for operating the rings, a thrust-collar, and diametrically oppositely arranged wedges on the collar, the point of each of which is provided with a hook to engage one of the shoulders on the hub and the heel is of uniform thickness.

CHARLES W. BOGART.

Witnesses:
CHILION M. FARRER,
GEORGE JARRETT.